Patented Mar. 17, 1953

2,631,993

UNITED STATES PATENT OFFICE 2,631,993

INSOLUBILIZATION OF POLYCARBON-AMIDES CONTAINING TERTIARY NITROGEN IN THE CHAINS

Paul W. Morgan, Kenmore, N. Y., assignor to E. I. du Pont de Nemours & Company, Wilmington, Del., a corporation of Delaware No Drawing. Application September 16, 1947, Serial No. 774,441

3 Claims. (Cl. 260—78)

This invention relates to polymeric materials. More particularly, it relates to new polymeric materials and to the method of making the same.

The term "polymeric material," as used throughout this specification and the appended claims, is intended to designate a macromolecular organic compound containing a recurring unit or units, which units may be cyclic or acyclic in nature, and which are linked together within the compound in chain-like fashion. The compound may be a naturally occurring one or may be partly or wholly synthetic. Cellulose is an example of a naturally occurring polymeric material, while examples of partly or wholly synthetic polymeric materials include such substances as cellulose esters or ethers, the so-called addition polymers including such substances as polyvinyl alcohol and its derivatives, polyacrylic acids and their derivatives, and the so-called condensation polymers, including such substances as the polyesters and polyamides of polycarboxylic acids, synthetic resins and the like.

Generally, polymeric materials of the type intended for use with this invention possess an average molecular weight in excess of 1000, and exist in the free state as solids at room temperature and atmospheric pressure.

It is an object of this invention to provide a new and useful polymeric material.

Another object of this invention is to provide a method of preparing polymeric materials having improved properties.

An additional object of this invention is to provide a new and improved method of cross-linking polymeric materials.

A still further object of this invention is to provide a process of cross-linking polymeric materials, which process is easy of accomplishment and readily controlled.

Other and additional objects of the invention will appear hereinafter.

The objects of this invention are accomplished, in general, by cross-linking one or a plurality of polymeric materials containing tertiary nitrogen or divalent sulfur groups by reaction with a poly-functional compound through the formation of onium salt bonds.

When the polymeric material to be cross-linked contains tertiary nitrogen, the onium salt is a quaternary ammonium salt which is illustrated by the following general structure:

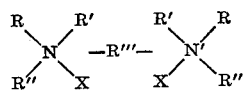

wherein:
R is a part of the principal polymeric chain;
R' is a part of the principal polymeric chain or any organic radical;
R'' is a part of the principal polymeric chain or any organic radical;
R''' is a radical between two functional groups in the cross-linking agents; and
X is the functional group of the cross-linking agent.

When the polymeric material to be cross-linked contains a divalent sulfur group, the onium salt is a sulfonium salt which is illustrated by the following general formula:

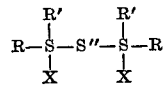

wherein:
R is a part of the principal polymeric chain;
R' is a part of the principal polymeric chain or any organic radical;
R'' is the radical between any two functional groups in the cross-linking agent; and
X is a halogen or other functional group of the cross-linking agent.

The present invention will be more clearly understood by reference to the following detailed examples, it being understood, however, that these examples are illustrative and that the scope of the invention is not to be limited thereto:

Example 1

Polyvinyl pyridine was freed of monomer by dissolving it in acetone and precipitating in water. 10 parts of the dried polymer in the form of coarse grains were placed in xylene containing 3% of 1,4-dibromobutene-2 and heated on a steam bath. After 15 minutes, the polymer was hard and insoluble on the surface, and in 1 hour it was hard and porous throughout.

Example 2

80 grams p-toluenesulfonyl chloride dissolved in 133 grams toluene were slowly added, with rapid stirring, to a solution of 20 grams hydroxyethylcellulose (0.3 hydroxyethyl groups per glucose unit), 28 grams sodium hydroxide and 260 cc. water at 0° C. The emulsion that first formed soon thickened to a stiff, tough mass, which after 1 hour was ground, washed with water, and extracted with methanol. Sulfur analysis showed that it contained 1.6 p-toluenesulfonyl groups per glucose unit.

The toluenesulfonyl groups in the above product were replaced by piperidyl groups as follows: 1 part of the product was immersed in 2 parts piperidine. An exothermic reaction took place and over a period of 72 hours the cellulose derivative formed a gel-like mass in the amine. The product was dissolved in pyridine and precipitated in water. Nitrogen and sulfur analysis showed that it contained 1.1 piperidyl groups and 0.5 p-toluenesulfonyl groups per glucose unit, and it was soluble in dilute acids, pyridine, methanol, chloroform-ethanol (90–10), etc.

To a 15% solution of the above prepared piperidyl cellulose derivative in 90 parts chloroform and 10 parts ethanol was added 2% of hexamethylene dibromide. The resulting solution was cast into tough, clear films which were heated 10 minutes at 100° C. The films were still tough and clear but were insoluble in all solvents.

Example 3

A polyamide was prepared by standard methods from equivalents of 1,4-bis(γ-aminopropyl)-piperazine and adipic acid.

(a) To a 15% solution of 1.2 grams of polymer in methanol-chloroform (12/88) was added 0.056 gram (4.5%) of 1.4-dibromobutene-2. A film was cast and heated at 85° C. for 20 minutes. The film was clear, pliable, and broke under a load of 15 pounds per square inch at 258° C. A control film (formed of the uncross-linked polymeric material) broke under the same load at 190° C. The cross-linked film was insoluble in methanol-chloroform (12/88) but swelled 93% of its original dimensions.

(b) Same as (a) above except that the casting solution contained 6% of p-xylene dichloride and the film was heated at 100° C. for 30 minutes. The film was slightly hazy, tough, swelled only 63% in methanol-chloroform (12/88), and broke under light load at 295° C. The film also swelled in boiling water, whereas a film of the uncrosslinked polymeric material was soluble in boiling water at least to the extent of 11%.

The above detailed examples illustrate embodiments of the invention wherein specific polymeric materials containing a tertiary nitrogen group were cross-linked by a poly-functional halogen compound through the formation of a quaternary ammonium salt. The present invention is not, however, to be so limited. In its broad scope, the present invention includes the treatment of any polymeric material containing tertiary nitrogen or divalent sulfur groups with any poly-functional reagent through the formation of a quarternary ammonium or sulfonium salt respectively.

As examples of polymeric materials which may contain the tertiary nitrogen or divalent sulfur groups, the following may be named: vinyl polymers, polyacrylic compounds, polymeric resins, cellulose derivatives, linear condensation products, for example, synthetic resins, synthetic linear condensation polyamides, polyesters, polyethers, and polyanhydrides.

Illustrative examples of polymers containing tertiary nitrogen or divalent sulfur which can be used are:

Polyamides from N,N'-diaminopropylpiperazine and adipic, sebacic, or glutaric acids;

Polyamides from diaminopropylmethylamine and adipic, glutaric, or azelaic acids;

Polyamides from N,N'-biscarboxyethylpiperazine and hexamethylenediamine or decamethylenediamine;

Polyamides from biscarboxyethylmethylamine and pentamethylenediamine, hexamethylenediamine or decamethylenediamine;

Polyamides from 4,7-dithiasebacic acid and any of the preceding diamines;

Polyamides from 4-thiapimelic acid and any of the amines above;

Polyamides from 1,7-diamino-4-thiaheptane and any of the acids named above;

Polyamides from 1,10-diamino-4,7-dithiadecane and any of the acids named above;

Polyesters from any of the above nitrogen- and sulfur-containing acids and ethylene glycol, diethylene glycol, hexamethylene glycol, xylylene glycol, etc.;

Polyesters from thiodiglycol or methyldiethanolamine and adipic acid, sebacic acid, phthalic acid, or terephthalic acid;

Polyanhydrides from 4,7-dithiasebacic acid or 4-thiapimelic acid;

Polysulfides from ethylene sulfide, propylene sulfide, or butadiene monosulfide;

Polyethers from ethylene oxide and any of the preceding sulfides;

Polymers from ethylene oxide with N-methylethyleneimine or dimethylaminopropylene oxide;

Cellulose derivatives containing tertiary amine groups derived from replacement of sulfonic ester groups;

Copolymers of vinyl pyridine or vinyl carbazole with vinyl chloride, vinyl acetate, vinylidene chloride, styrene, methyl methacrylate, or acrylonitrile;

Copolymers of vinyl butyl sulfide or 2-vinylthiophene with any of the preceding monomers;

Polymers and copolymers of diethylaminoethyl methyl methacrylate or dimethylaminoethyl methyl methacrylate.

The poly-functional reagent which constitutes the cross-linking agent can be any saturated or unsaturated compound having poly-functional groups which react with tertiary nitrogen or divalent sulfur groups to produce an onium salt. The cross-linking agent can contain other groups, such as unsaturation, carboxyl groups, ether groups and phenol groups, preferably located in the molecule so as to increase the reactivity of the functional groups which react with the tertiary nitrogen or divalent sulfur groups. The preferred cross-linking agents are aliphatic (saturated) or alkylene (ethylenicly unsaturated) or aryl dihalides or compounds containing poly-functional halogen groups, such as mono-, di- or tri-chloroacetates, chloroacetals, chlorketals and the like; aliphatic (saturated) or alkylene (ethylenicly unsaturated) or aryl dithiocyanates; and aliphatic (saturated) or alkylene (ethylenicly unsaturated) or aryl disulfonates.

The following are illustrative examples of specific compounds which can be used as cross-linking agents:

Dihalides, such as 1,5-dichloropentene-2
  1,6-dichlorohexene-2
  1,7-dichloroheptene-2
  1,2-dibromoethane
  1,2-dichloropropane
  1,3-dibromopropane
  1,4-dibromobutene-2
  1,4-dichlorobutene-2
  1,4-dibromobutane
  1,5-dibromopentane
  1,6-dichlorohexane-2,5-dione
  1,3-dichloropropanol-2
  2,3-dichloropropanol-1
  p-Xylylenedichloride
  p-Xylylene dibromide
  m-Xylylene dichloride
  o-Xylylene dibromide
  1,4-bischloromethylnaphthalene
  1,6-bischloromethylnaphthalene
  1,4-bischloromethylanthracene
  1,4-bis($\beta$-chloroethyl)benzene
  1,3-bis($\beta$-bromoethyl)benzene
  $\beta,\beta'$-Dichloroethyl ether
  Bis($\beta$-chloroisopropyl) ether
  Bis($\gamma$-chloropropyl) ether
  Bischloromethyl ether
  Bis($\beta$-chloroisobutyl) ether Dithiocyanates, such as 1,5-dithiocyanopentene-2
  1,6-dithiocyanohexene-2
  1,7-dithiocyanoheptene-2
  1,2-dithiocyanoethane
  1,2-dithiocyanopropane
  1,3-dithiocyanopropane
  1,4-dithiocyanobutene-2
  1,4-dithiocyanobutane
  1,5-dithiocyanopentane
  1,6-dithiocyanohexane-2,5-dione
  1,3-dithiocyanopropanol-2
  2,3-dithiocyanopropanol-1
  p-Xylylenedithiocyanate
  m-Xylylene dithiocyanate
  o-Xylylene dithiocyanate
  1,4-bisthiocyanomethylnaphthalene
  1,6-bisthiocyanomethylnaphthalene
  1,4-bisthiocyanomethylanthracene
  1,4-bis($\beta$-thiocyanoethyl)benzene
  1,3-bis($\beta$-thiocyanoethyl)benzene
  $\beta,\beta'$-Dithiocyanoethyl ether
  Bis($\beta$-thiocyanoisopropyl) ether
  Bis($\gamma$-thiocyanopropyl) ether
  Bisthiocyanomethyl ether
  Bis($\beta$-thiocyanoisobutyl) ether
  $\alpha,\alpha'$-Dichloroglutaric acid
  $\alpha,\alpha'$-Dithiocyanoadipic acid
  $\alpha,\alpha'$-Dithiocyanoazelaic acid
  $\alpha,\alpha'$-Dithiocyanosebacic acid Sulfonic acid esters, such as Ethylene glycol ditoluenesulfonate
  1,4-butylene glycol dinaphthalenesulfonate
  1,4-butylene glycol dibenzenesulfonate
  Glycerol ditoluenesulfonate
  Thiodiglycol ditoluenesulfonate
  Ethylene glycol dibutanesulfonate
  1,4-butylene glycol dimethanesulfonate
  1,6-hexamethylene glycol dibenzenesulfonate
  1,4-cyclohexanediol ditoluenesulfonate Halogenated alkyl esters, such as Dichloroethyl fumarate
  Dichloroethyl glutarate
  Dichloroethyl malate
  Dichloroethyl oxalate
  Dichloroethyl phthalate
  Bromoethyl phthalate
  $\beta$-Bromoisopropyl phthalate
  $\beta$-Chloroisobutyl phthalate
  $\omega$-Chlorobutyl phthalate
  $\alpha$-Chloro-$\eta$-butyl phthalate
  2-bromopropyl phthalate Compounds containing three or more active groups, such as Glycerin trichlorohydrin
  Glycerin dichlorohydrin chloroacetyl ester or thiocyanoacetyl ester
  Glycerin tritoluenesulfonate
  Pentaerythritol tetrakis-(chloroacetate)
  1,2,3-trihydroxymethylpropane tris(bromoacetate)
  Tris(chloroethyl) citrate
  1,3,5-tris(chloromethyl) benzene In addition to the above, the monochloro- and monobromoacetyl esters of glycols and the bromoacetyl or chloroacetyl esters of halogenated alcohols, such as ethylene chlorohydrin, glycerol chlorohydrins, propylene glycol chlorohydrin, etc., can be used. Thiocyanoacetic, thiocyanopropionic, and any halogenated monobasic acid also can be used to form such types of reagents.

The invention can also be applied to the cross-linking of one polymer containing tertiary nitrogen or divalent sulfur groups by another polymer containing reactive groups through the formation of onium compounds. Thus, for example, a polymeric material containing tertiary nitrogen or divalent sulfur groups can be cross-linked by cellulose acetate chloroacetate, etc.

Likewise, the invention can be utilized by cross-linking two or more polymers containing groups of like function, such as tertiary nitrogen or divalent sulfur groups or mixtures of such groups, by a poly-functional reagent, as herein described.

As shown in the examples, the process of this invention makes possible the preparation of shaped products of the cross-linked polymeric material. The shaped article is prepared generally from a solution of the two reactants which are preferably compatible. However, this is not essential. The polymeric material containing the tertiary nitrogen or divalent sulfur groups can be formed into the desired shaped article, and such shaped article can be treated with the cross-linking agent. For example, a formed structure, such as a sheet of the polymeric material containing tertiary nitrogen or divalent sulfur groups, can be treated in sheet form with the poly-functional reagent. In the embodiment of the invention where the polymeric material is a cellulosic compound, a formed structure such as a sheet of regenerated cellulose can be treated to produce the desired cellulosic polymer containing the tertiary group and thereafter such polymeric material treated with the desired poly-functional reagent.

This invention provides a simple and easily controlled process for the cross-linking of polymeric materials. These cross-linked polymeric materials are insoluble in water and the common organic solvents. The invention thus provides a simple, direct method for the transformation of a polymeric material into a polymeric material that is insoluble in water and organic solvents.

The process does not give rise to the formation of undesirable by-products, the cross-linked polymeric material finally obtained being substantially free of such substances and possessing a light color.

The invention produces products having higher sticking temperatures, higher zero strength, lower creep and elongation, solvent-resistance, etc. in fibers, films and coating compositions. The quaternary ammonium types show improved dye affinity and on some polymers are useful as ion exchange resins.

Since it is obvious that many changes and modifications can be made in the above-described details without departing from the nature and spirit of the invention, it is to be understood that the invention is not to be limited thereto except as set forth in the appended claims.

I claim:

1. A method of insolubilizing a linear polycarbonamide containing, as links in the polymer chain, tertiary nitrogen atoms which comprises cross-linking said polyamide by treating said polyamide with a polyfunctional, halogen containing cross-linking agent containing a plurality of groups reactive to form quaternary ammonium linkages, and reacting said tertiary nitrogen groups in said polyamide with said reactive groups in said agent to produce a resultant polymer which contains said linkages as cross-links and which is insoluble in solvents for the unmodified polyamide.

2. A process in accordance with claim 1 in which said cross-linking agent is a dihalide.

3. A method of insolubilizing a polyamide prepared from equivalents of 1,4-bis(γ-aminopropyl) piperazine and adipic acid, which comprises heating said polyamide with 1,4-dibromobutene-2.

PAUL W. MORGAN.

REFERENCES CITED

The following references are of record in the file of this patent:

UNITED STATES PATENTS

| Number | Name | Date |
| --- | --- | --- |
| 2,218,739 | Bruson | Oct. 22, 1940 |
| 2,309,575 | Coes | Jan. 26, 1943 |
| 2,314,972 | Dreyfus | Mar. 30, 1943 |
| 2,363,614 | Patrick | Nov. 28, 1944 |
| 2,561,814 | Novotny et al. | July 24, 1951 |

FOREIGN PATENTS

| Number | Country | Date |
| --- | --- | --- |
| 493,592 | Great Britain | Oct. 11, 1938 |

OTHER REFERENCES

Karrer, Organic Chemistry, 2nd English edition, 1946, page 122.

Bennett, Concise Chemical and Technical Dictionary, Chemical Publishing Co., 1947, page 682, item "Onium."